US010298303B2

(12) United States Patent
Saito et al.

(10) Patent No.: US 10,298,303 B2
(45) Date of Patent: May 21, 2019

(54) RADIO

(71) Applicant: OMRON Corporation, Kyoto-shi, Kyoto (JP)

(72) Inventors: Keisuke Saito, Suita (JP); Taiji Yoshikawa, Kizugawa (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/679,949

(22) Filed: Aug. 17, 2017

(65) Prior Publication Data

US 2017/0346538 A1    Nov. 30, 2017

Related U.S. Application Data

(63) Continuation of application No. PCT/JP2016/056158, filed on Mar. 1, 2016.

(30) Foreign Application Priority Data

Mar. 6, 2015    (JP) .................................. 2015-045193

(51) Int. Cl.
*H04B 7/06*    (2006.01)
*H04B 7/02*    (2018.01)
(Continued)

(52) U.S. Cl.
CPC ........... *H04B 7/0608* (2013.01); *H04B 7/005* (2013.01); *H04B 7/0695* (2013.01); *H04B 7/0834* (2013.01); *H04B 7/10* (2013.01)

(58) Field of Classification Search
CPC .... H04B 7/0608; H04B 7/0834; H04B 7/005; H04B 5/0043; H04B 7/02; H04B 7/0602; H04B 7/0802; H01Q 3/24; H01Q 17/001
See application file for complete search history.

(56) References Cited

U.S. PATENT DOCUMENTS 4,742,609 A * 5/1988 Neumann ................ B23Q 1/01
                                                    29/26 A
7,996,034 B1 * 8/2011 Yegnashankaran ..........................
                                                    H04W 64/006
                                                    455/550.1
(Continued)

FOREIGN PATENT DOCUMENTS

JP      S54-127616 A    10/1979
JP      2003-36729 A     2/2003
(Continued)

OTHER PUBLICATIONS

International Search Report of PCT/JP2016/056158 dated Apr. 5, 2016.
(Continued)

*Primary Examiner* — Andrew Wendell
(74) *Attorney, Agent, or Firm* — Metrolexis Law Group, PLLC (57) ABSTRACT

Provided is a radio formed to be capable of performing wireless communication with a sensor that measures a predetermined environmental parameter in a predetermined closed space, the radio including an antenna portion disposed in the predetermined closed space and for performing wireless communication with the sensor, and a control unit that controls a mode by which the antenna portion transmits and receives wireless radio waves such that standing waves envisaged to be formed in the predetermined closed space based on radio waves transmitted from the sensor to the antenna portion, or standing waves envisaged to be formed in the predetermined closed space based on radio waves transmitted from the antenna portion to the sensor change with the lapse of time during the wireless communication.

7 Claims, 4 Drawing Sheets

(51) Int. Cl.
*H01Q 17/00* (2006.01)
*H04B 7/10* (2017.01)
*H04B 7/005* (2006.01)
*H04B 7/08* (2006.01)

(56) References Cited

U.S. PATENT DOCUMENTS

| | | | | |
|---|---|---|---|---|
| 8,553,550 B2 * | 10/2013 | Shiotsuki | ............... | H01Q 19/32 370/230.1 |
| 2006/0158653 A1 * | 7/2006 | Chiarello | ............... | B82Y 15/00 356/445 |
| 2007/0279205 A1 * | 12/2007 | Ide | ............... | B60C 23/0416 340/447 |
| 2009/0251360 A1 * | 10/2009 | Uebo | ............... | G01S 13/32 342/129 |
| 2009/0279523 A1 * | 11/2009 | Doi | ............... | H04B 7/0617 370/338 |
| 2013/0084408 A1 * | 4/2013 | Nakao | ............... | H01J 37/32229 427/569 |
| 2014/0210635 A1 | 7/2014 | Majava | | |
| 2014/0225784 A1 * | 8/2014 | Li | ............... | H01Q 1/38 343/700 MS |
| 2015/0171977 A1 * | 6/2015 | Kashiwagi | ............... | H01Q 3/24 342/351 |

FOREIGN PATENT DOCUMENTS

| | | | |
|---|---|---|---|
| JP | 2008-289192 A | 11/2008 | |
| JP | 2012-20359 A | 2/2012 | |
| JP | 2012-156296 A | 8/2012 | |
| JP | 2013-86196 A | 5/2013 | |

OTHER PUBLICATIONS

English translation of Written Opinion of PCT/JP2016/056158 dated Apr. 5, 2016 from the International Searching Authority.
Extended European search report (EESR) dated Oct. 25, 2018 in a counterpart European patent application.

* cited by examiner

RADIO

CROSS REFERENCE TO RELATED APPLICATIONS

This application is a continuation application of International Application No. PCT/JP2016/056158, filed on Mar. 1, 2016, which claims priority based on the Article 8 of Patent Cooperation Treaty from prior Japanese Patent Application No. 2015-045193, filed on Mar. 6, 2015, the entire contents of which are incorporated herein by reference.

TECHNICAL FIELD

The disclosure relates to a radio.

RELATED ART

With a machine tool that performs cutting processing or the like on an object to be processed, it is required to accurately grasp the state of the cutting tool or the like, in order to manage processing accuracy. In view of this, Patent Document 1 discloses technology in which a diagnostic apparatus for the cutting tool is provided for each machine tool, data on the electric current of a spindle motor is collected, and the state of the cutting tool mounted on the spindle motor is diagnosed. The data on electric current measured by an electric current sensor of the spindle motor provided in each wireless machine tool is wirelessly transmitted to the diagnostic apparatus with a wireless LAN every a predetermined time period. Then, the states of the cutting tools are diagnosed by the diagnostic apparatuses in which the electric current data is aggregated using the electric current data, in real time substantially simultaneously.

Also, when information relating to the state of the cutting tool during processing is collected, a technique for collecting information utilizing wireless communication is widely used. For example, in Patent Document 2, a configuration is adopted in which a communication unit that performs wireless communication is arranged so as to be detachable from a cable member of a sensor for acquiring physical information relating to the cutting tool. According to such an arrangement, it is possible to separate the communication unit in a state in which the cable member is attached to the main body of the sensor, and thus when the cutting tool is replaced, the main body of the sensor need only be separated from the communication unit and replaced along with the cutting tool, achieving an improvement in the efficiency of the replacement operation.

RELATED ART DOCUMENTS

Patent Documents

Patent Document 1: JP 2013-86196A
Patent Document 2: JP 2012-20359A

SUMMARY OF THE INVENTION

Problem to be Solved by the Invention

In the machine tool that performs cutting or the like, the state of the cutting tool greatly influences the processing accuracy, and thus it is extremely important to monitor the state of the cutting tool from the viewpoint of management of the processing accuracy and the like. Examples of environmental parameters that express the state of the cutting tool include various physical parameters such as a temperature and vibration of the cutting tool. Moreover, in order to measure these environmental parameters, it is necessary to dispose a sensor for measurement in the vicinity of the cutting tool. Meanwhile, cutting oil is utilized in an environment in which such cutting processing is performed, and thus a cable for supplying power to the sensor and a cable for transferring measured data tend to deteriorate due to an influenced of the cutting oil. Thus, these cables need be replaced as appropriate, which causes a decrease in processing efficiency of the machine tool.

In view of this, by adopting a wireless sensor system for transferring measured data from the sensor via wireless communication, it is possible to avoid use of cables relating to the sensors. However, in an environment in which cutting processing is performed, as described above, cutting oil or the like is used and the cutting tool is rotated at a high speed, for example, and thus from the viewpoint of safety, health, and the like, in order to prohibit access to a space in which cutting is performed during processing, this cutting processing is performed in a predetermined closed space. Processing in such a predetermined closed space does not only apply to cutting processing but also various processes such as pressing and laser processing. Moreover, when attempting to collect measured data in the closed space via wireless communication, standing waves caused by radio waves are generated in this closed space, and there are cases where regions (that is, nodes of standing waves) in which it is difficult to perform good wireless communication in the closed space are formed in a spotty manner, and there is a risk that collection of measured data will be inhibited in some cases.

One or more embodiments have been made in view of such a problem, and one or more embodiments may provide a radio that can suitably collect data measured by a sensor, via wireless communication in a predetermined closed space.

Means for Solving the Problems

In order to resolve the above-described issues, one or more embodiments may focus on the mode by which an antenna portion of the radio transmits and receives wireless radio waves. Specifically, one or more embodiments provide a radio formed to be capable of performing wireless communication with a sensor that measures a predetermined environmental parameter in a predetermined closed space, the radio including an antenna portion disposed in the predetermined closed space and for performing wireless communication with the sensor, and a control unit that controls a mode by which the antenna portion transmits and receives wireless radio waves, such that standing waves envisaged to be formed in the predetermined closed space based on radio waves transmitted from the sensor to the antenna portion, or standing waves envisaged to be formed in the predetermined closed space based on radio waves transmitted from the antenna portion to the sensor change with lapse of time during the wireless communication.

The radio according to one or more embodiments is formed to be capable of performing wireless communication with a sensor via the antenna portion. Thus, this sensor also internally has a predetermined antenna portion so as to be capable of performing wireless communication with this radio, and the above-described control unit is configured to control a mode by which the antenna portion provided in the radio itself transmits and receives wireless radio waves.

Here, the predetermined closed space in which the sensor is disposed is a space in which a predetermined environmental parameter to be measured by the sensor is present to an extent detectable by the sensor, and examples of the predetermined environmental parameter include physical parameters such as temperature, humidity, and vibration (acceleration) and chemical parameters such as the concentration of a predetermined substance. Also, the predetermined closed space needs only be a space that is physically closed from the outside to some extent for various purposes, and for example, may be a closed space formed in the machine tool or the like from the view point of safety and health, or may be a closed space in which ventilation with the outside is restricted as needed. In any case, the predetermined closed space is formed by a physical wall or the like for separation from the outside to some extent.

One example of such a predetermined closed space is a closed space in which a predetermined processing apparatus for machining an object to be processed is internally disposed and lubricant for machine processing is used during machining by the predetermined processing apparatus. The closed space is formed in order to avoid leakage of machining filings, noise, and the like that are produced by the machining and lubricant such as cutting oil in such a predetermined closed space.

Moreover, in such a predetermined closed space, data transmission and reception are performed in which data relating to an environmental parameter measured by the sensor is transmitted from the sensor to the antenna portion of the radio and the antenna portion receives the transmitted data, or control data transmitted from the radio to the sensor is transmitted from the antenna portion to the sensor and the sensor receives the control data. Meanwhile, a wall or the like for forming this closed space is present in the predetermined closed space, and thus standing waves including nodes at which the intensity of radio waves weakens can be generated in the predetermined closed space due to radio waves for transmitting and receiving data being reflected by the wall or the like and radio waves overlapping with each other. When such nodes of standing waves are generated near the sensor or the antenna portion of the radio, in particular, transmission and reception of data therebetween will be influenced, and it will be difficult to collect the measured environmental parameter.

In view of this, in the radio according to one or more embodiments, the mode by which the antenna portion transmits and receives wireless radio waves is controlled such that standing waves envisaged in the predetermined closed space change with the lapse of time during wireless communication, in other words, such that standing waves in the predetermined closed space are not fixed. In general, it is not easy to detect how standing waves formed in the predetermined closed space are formed, and when attempting to detect standing waves, many measurement devices and the like are required for this detection. In view of this, in one or more embodiments, instead of being based on the state of standing waves that are actually formed in the predetermined closed space, the mode by which the antenna portion transmits and receives wireless radio waves is changed over time such that standing waves that are merely envisaged are not fixed but change. Accordingly, in the predetermined closed space, nodes of standing waves where wireless radio waves weaken are not fixed, and transmission and reception of data between the sensor and the radio can be relatively stabilized.

Here, as control of the mode by which the antenna portion transmits and receives wireless radio waves performed by the control unit, a technique in which a relative position of the antenna portion with respect to the sensor is changed over time, or a method in which the directivity of the antenna portion transmitting and receiving wireless radio waves with respect to the sensor is changed over time can be adopted. First, in the case of the former method, the antenna portion may include a plurality of antennas that support diversity communication, and the control unit may switch an antenna that performs transmission and reception of radio waves in accordance with lapse of time such that the standing waves change with the lapse of time during the wireless communication. By switching a plurality of antennas in accordance with the lapse of time, a distance between the sensor and the antenna portion changes. As a result, nodes of standing waves are not fixed in the predetermined closed space, and transmission and reception of data between the sensor and the radio can be relatively stabilized.

Also, in the case of the latter method, the antenna portion may include a directional antenna, and the control unit may change a directivity condition that is applied to the directional antenna in accordance with lapse of time such that the standing waves change with the lapse of time during the wireless communication. By changing the directivity in this manner, a direction in which wireless radio waves travel in the predetermined closed space changes, and thus positions of the nodes of standing waves formed in the predetermined closed space can be changed with lapse of time. Accordingly, positions of the nodes of standing waves are not fixed in the predetermined closed space, and transmission and reception of data between the sensor and the radio can be relatively stabilized.

Moreover, as one example of controlling of the above-described directivity condition, the control unit may control the directivity condition that is applied to the directional antenna based on a received signal intensity obtained when radio waves transmitted from the sensor are received by the antenna portion. If standing waves are generated in the predetermined closed space and the antenna portion is influenced by the nodes of standing waves, this influence reflects on the received signal intensity in the antenna portion. In view of this, by controlling the directivity condition based on this received signal intensity, stabilization of wireless communication is expected. Note that as one example of control of the directivity condition, for example, if the received signal intensity of the antenna portion becomes lower than an intensity that serves as a threshold value required for stable wireless communication, the directivity conditions may be changed.

Here, in the above-described radio, the predetermined closed space may be provided with a transparent window portion such that inside of the predetermined closed space is visible from outside of the predetermined closed space, and the window portion may be covered with a transparent metal film. That is, it is possible to check the situation in the predetermined closed space through the window portion. If the predetermined closed space is a processing space in the machine tool, for example, a user can check the situation of the processing by such a window portion. On the other hand, if wireless radio waves are internally used, it may not be always preferable that wireless radio waves leak to the outside of the predetermined closed space. This is because another machine will be influenced by wireless radio waves, and energy consumption of wireless radio waves will wastefully increase due to leakage, for example. In view of this, it is possible to suppress leakage of wireless radio waves while securing visibility of an inner space by the window portion being covered with a transparent metal film. An example of the transparent metal film is an ITO film (indium tin oxide).

Note that, by covering the window portion with the transparent metal film, wireless radio waves do not easily leak to the outside, whereas if standing waves are generated in the predetermined closed space, there is a possibility that the influence of standing waves on wireless communication will increase. However, as described above, with the radio according to one or more embodiments, the mode by which the antenna portion transmits and receives wireless radio waves is controlled by the control unit, and thus it is possible to suppress the influence caused by standing waves as much as possible.

Also, in the above-described radio, a radio wave absorbing member exhibiting a property of absorbing radio waves having a predetermined frequency used in wireless communication with the sensor may be disposed on an inner wall surface of the predetermined closed space. Accordingly, it is possible to suppress the influence caused by standing waves in the predetermined closed space, and to relatively stabilize transmission and reception of data between the sensor and the radio.

Effects of the Invention

It is possible to provide a radio that can suitably collect data measured by a sensor in a predetermined closed space via wireless communication.

EMBODIMENTS OF THE INVENTION

A machine tool 10 provided with a radio 1 according to one or more embodiments, and the radio 1 will be described with reference to the drawings. Note that the configuration of the following embodiments is merely an example, and the present invention is not limited to the configuration of the embodiments.

Embodiment 1

Figure 1:
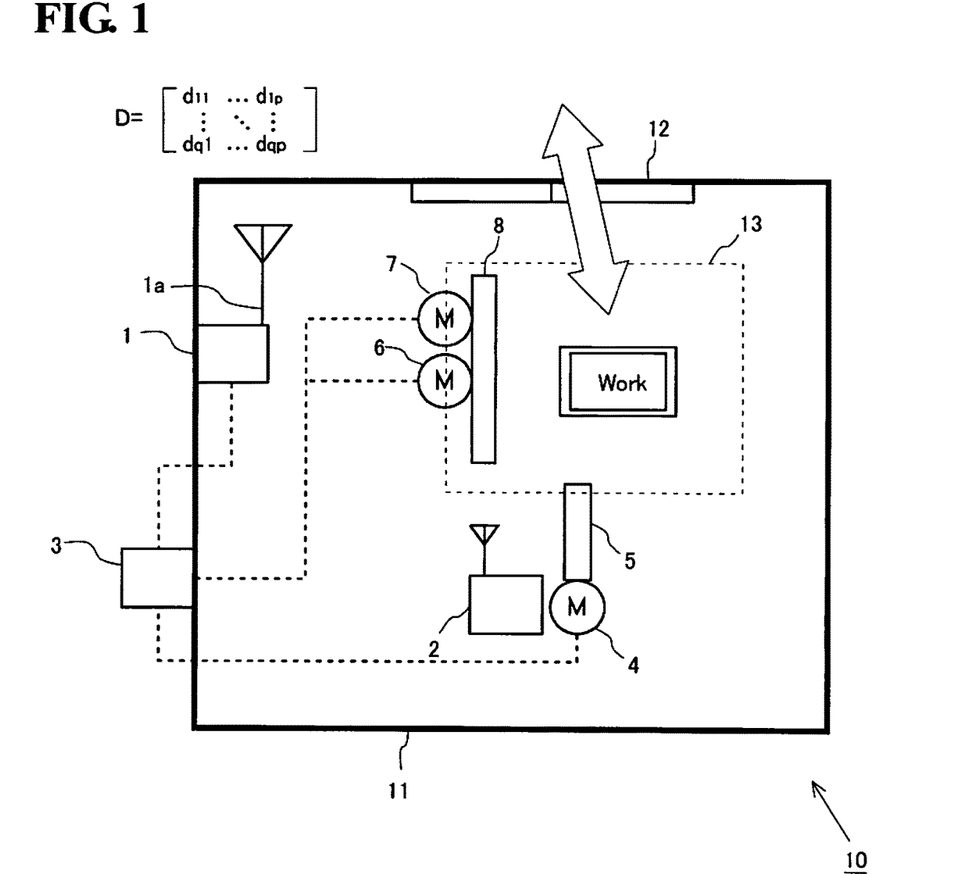
FIG. 1 is a diagram illustrating a schematic configuration of a machine tool including a radio according to one or more embodiments.

FIG. 1 is a diagram showing a schematic configuration of the machine tool 10 such as a cutting machine used in a factory, and the arrangement of the radio 1 and the like included therein. Specifically, the machine tool 10 is provided with a control apparatus 3 such as a PLC (programmable logic controller), and a motor 4 that rotates and drives a cutting tool 5 for subjecting a work piece to cutting processing and motors 6 and 7 that control a position on the XY plane of a table 8 on which the work piece is mounted are controlled by this control apparatus 3. Note that although not shown in FIG. 1, the machine tool 10 is provided with a motor for controlling the position in the Z direction of the cutting tool. Note that control of the driving of the motor 4 and the like by the control apparatus 3 is conventional technology, and is not central to one or more embodiments, and thus specific description thereof is omitted.

Here, a sensor 2 for checking the state of the cutting tool 5 that is rotated and driven by the motor 4 is disposed in the vicinity of the motor 4. The sensor 2 is a temperature sensor for measuring the temperature of the cutting tool 5. Moreover, information on the temperature measured by the sensor 2 is transmitted to the radio 1 by an antenna provided in the sensor 2. Here, although it is assumed that the sensor 2 is a temperature sensor that measures temperature information for grasping the state of the cutting tool 5 in one or more embodiments, the sensor 2 may be a sensor for measuring an environmental parameter other than temperature information depending on the purpose of processing in the control apparatus 3. Examples of the sensor 2 include physical system sensors such as an acceleration sensor, a magnetic sensor, a photoelectric sensor, a temperature sensor, a humidity sensor, an illuminance sensor, a flow sensor, and a pressure sensor, and chemical system sensors such as a $CO_2$ sensor and a pH sensor.

In this manner, in the machine tool 10, the radio 1 is electrically connected to the control apparatus 3 with a cable. Moreover, the information on the temperature measured by the sensor 2 is transferred from the sensor 2 to the radio 1 via wireless communication and passed to the control apparatus 3, and thereby the state of the cutting tool 5, in particular, the state of the cutting tool 5 in use, such as whether the temperature of the cutting tool 5 abnormally increases, is monitored. Note that such processing relating to monitoring of the state of the cutting tool 5 is conventional technology, and is not central to one or more embodiments, and thus specific description thereof is omitted.

Here, the radio 1 has a phased-array antenna 1a, which is a directional antenna. The phased-array antenna 1a is an antenna according to a conventional technique, and briefly speaking, it has a directivity control function that can change the direction of transmitting radio waves or conversely increase the sensitivity of reception of radio waves in a specific direction by slightly changing the phase of a signal that is applied to the antenna elements of the antenna array. Therefore, the phased-array antenna 1a of the radio 1 is an antenna that can more sensitively execute the transmission of radio waves in a specific direction and the reception of radio waves in a specific direction compared to other directions, and that can arbitrarily control this specific direction. In one or more embodiments, control in this specific direction in the phased-array antenna 1a is referred to as "directivity condition control in the phased-array antenna".

By controlling the directivity condition of the phased-array antenna 1a in this manner, the radio 1 having the phased-array antenna 1a can efficiently deliver wireless radio waves for control to the sensor 2 in the machine tool 10, and can efficiently receive wireless radio waves including the measured temperature information from the sensor 2. Note that the sensor 2 has an omnidirectional antenna. Thus, the directivity condition of the phased-array antenna 1a is set such that the radio 1 can efficiently receive wireless radio waves delivered from the sensor 2, for example, the received signal intensity of a signal received by the radio 1 is higher than a predetermined threshold. Note that in FIG. 1, the directivity of the phased-array antenna is represented by D in the case where the radio 1 performs wireless communication with the sensor 2.

Here, in the machine tool 10, the above-described motors 4, 6, and 7, cutting tool 5, sensor 2, radio 1, and phased-array antenna 1*a* thereof are disposed in a closed space formed by a metal body 11. This is for preventing scattering of filings formed when a work piece is subjected to cutting processing by the cutting tool 5, cutting oil used in cutting processing, or the like. Also, a state in which a processing region 13 that is subjected to cutting processing can be accessed from the outside during processing is not preferable in terms of safety. In view of this, a configuration is adopted in which, in principle, the body 11 other than a door portion 12 for inserting and removing a work piece into/from the processing region 13 does not have a site that links the inside and the outside of the machine tool 10, and control of driving of the motor 4 and the like by the control apparatus is not executed in a state in which the door portion 12 is open.

Also, the door portion 12 is provided with a window portion formed by a transparent member such that the situation of the processing region 13 located inside the machine tool 10 is visible from the outside. Accordingly, the user of the machine tool 10 can control the machine tool 10 while directly checking the situation of the cutting processing performed on the work piece. Note that as described above, information on the temperature measured by the sensor 2 is wirelessly transferred to the radio 1 in the closed space of the machine tool 10. In view of this, the window portion provided in the door portion 12 is covered by an ITO film (indium tin oxide film), which is a transparent metal film, such that radio waves for this wireless transfer do not leak to the outside of the machine tool 10. The ITO film is a metal film, and thus can suitably reflect wireless radio waves for wireless communication and provide security for a user to check the inside without decreasing the original visibility of the window portion due to its transparency, while suppressing leakage of wireless radio waves to the outside.

In the machine tool 10 configured in this manner, it is possible to grasp the state of the cutting tool 5 during processing for cutting the work piece via information on the temperature measured by the sensor 2, and the temperature information for grasping the state is collected via wireless communication between the radio 1 and the sensor 2. Moreover, wireless communication between the radio 1 and the sensor 2 is performed in a closed space surrounded by the body 11 (more specifically, a closed space surrounded by the body 11 and the ITO film of the window portion disposed in the door portion 12). The radio 1 has the above-described phased-array antenna 1*a*, and thus, basically, can efficiently receive wireless radio waves transmitted from the sensor 2. However, in the closed space of the body 11, wireless radio waves transmitted from the sensor 2 are reflected by an inner wall surface of the body 11 that forms this closed space or a structure (the motors, the table 8, the work piece, and the like) disposed in the closed space, and are not always efficiently received by the phased-array antenna 1*a*.

Figure 2A:
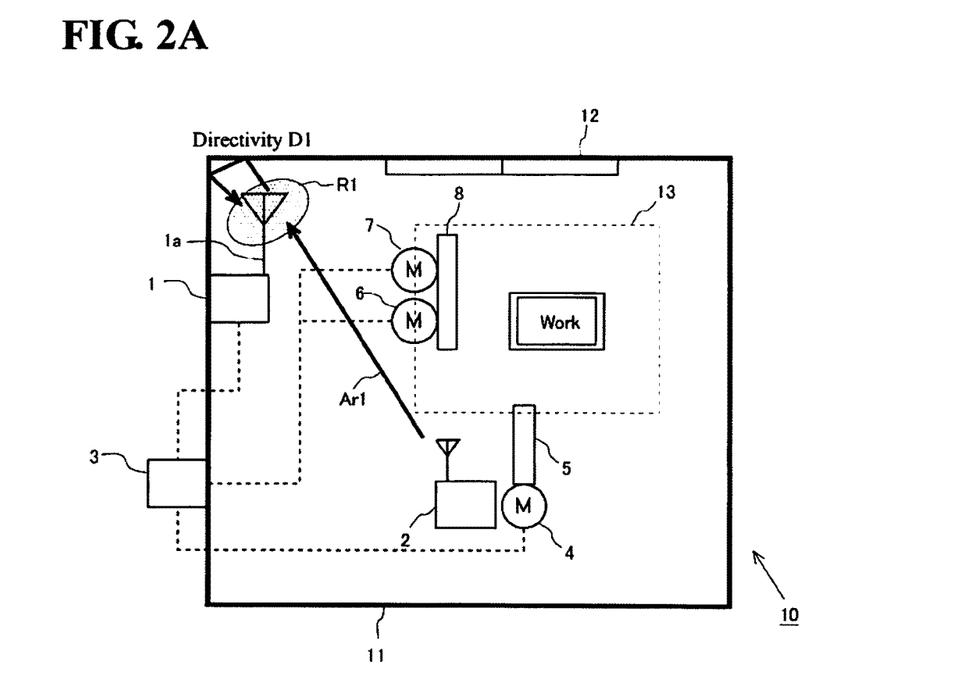
FIGS. 2A and 2B are diagrams illustrating positions of nodes of standing waves caused by wireless radio waves in a machine tool, such as in FIG. 1.
Figure 2B:
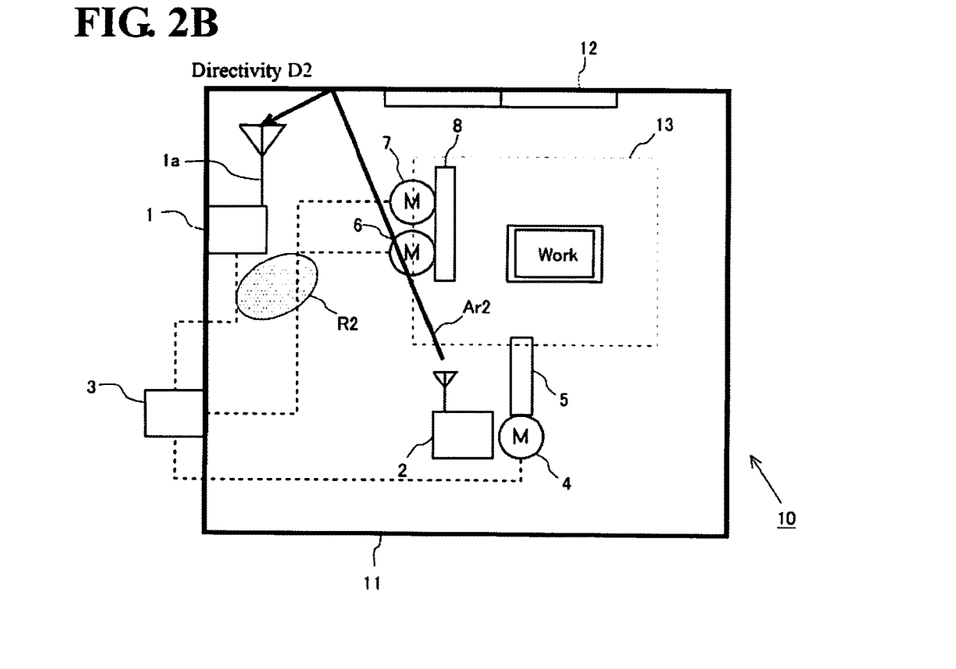

In particular, in wireless communication performed in the closed space such as with the machine tool 10, standing waves are formed by wireless radio waves transmitted from the sensor 2 overlapping with each other by paths extending to the phased-array antenna 1*a*, and at this time, if nodes at which the intensity of standing waves weakens are formed in the vicinity of the phased-array antenna 1*a*, temperature information is not efficiently transferred from the sensor 2 to the radio 1. Here, FIGS. 2A and 2B show two different situations with regard to formation of nodes of standing waves in the closed space in a case where wireless communication is performed between the radio 1 and the sensor 2 in the closed space in the machine tool 10. In the situation shown in FIG. 2A, the directivity condition set in the phased-array antenna 1*a* is D1, which corresponds to the direction of an arrow Ar1 pointing from the sensor 2 to the radio 1 at this time. Therefore, when the directivity condition D1 is set in the phased-array antenna 1*a*, originally, the phased-array antenna 1*a* can efficiently receive wireless radio waves transmitted from the sensor 2 extending in the direction of the arrow Ar1.

However, in the case shown in FIG. 2A, wireless radio waves extending in the direction of the arrow Ar1 are reflected by the inner wall surface of the body 11 located toward the back of the phased-array antenna 1*a*, and when wireless radio waves return to a region R1 located in the vicinity of the phased-array antenna 1*a* again, nodes of standing waves generated by overlapping with wireless radio waves transmitted from the sensor 2 are formed in this region R1. If nodes of standing waves caused by wireless radio waves are formed in the vicinity of the phased-array antenna 1*a* in this manner, the received signal intensity of wireless radio waves received by the phased-array antenna 1*a* will significantly decrease, and thus information on the temperature measured by the sensor 2 is not likely to be efficiently transferred.

On the other hand, in the case shown in FIG. 2B, the directivity condition set in the phased-array antenna 1*a* is D2, which is different from the case of FIG. 2A. The directivity condition D2 is a directivity condition set such that in a case where wireless radio waves having a directivity indicated by an arrow Art are reflected by the inner wall surface of the body 11 as shown in FIG. 2B, the reflected radio waves can be received efficiently. In a case where this directivity condition D2 is set, similarly, standing waves are generated due to wireless radio waves transmitted from the sensor 2 overlapping with each other in the closed space of the machine tool 10, nodes thereof are located in a region R2 that is spaced apart from the phased-array antenna 1*a*. Therefore, in the case of the directivity condition D2, wireless communication between the radio 1 and the sensor 2 is not easily influenced by nodes of standing waves. Also, in a case where any kind of control signal or the like is transmitted from the radio 1 to the sensor 2, similarly, there is a possibility that wireless communication will be influenced by standing waves in the closed space.

Note that the situation of standing waves shown in FIGS. 2A and 2B is merely an example, and standing waves other than in these situations naturally exist. In particular, the table 8 or the work piece moves by a motor in the closed space of the machine tool 10, and thus wireless radio waves that are transmitted and received between the radio 1 and the sensor 2 are reflected by various structures in the closed space. Thus, the situation of standing waves formed in the closed space may regularly or irregularly change depending on the situation of this reflection.

Figure 3:
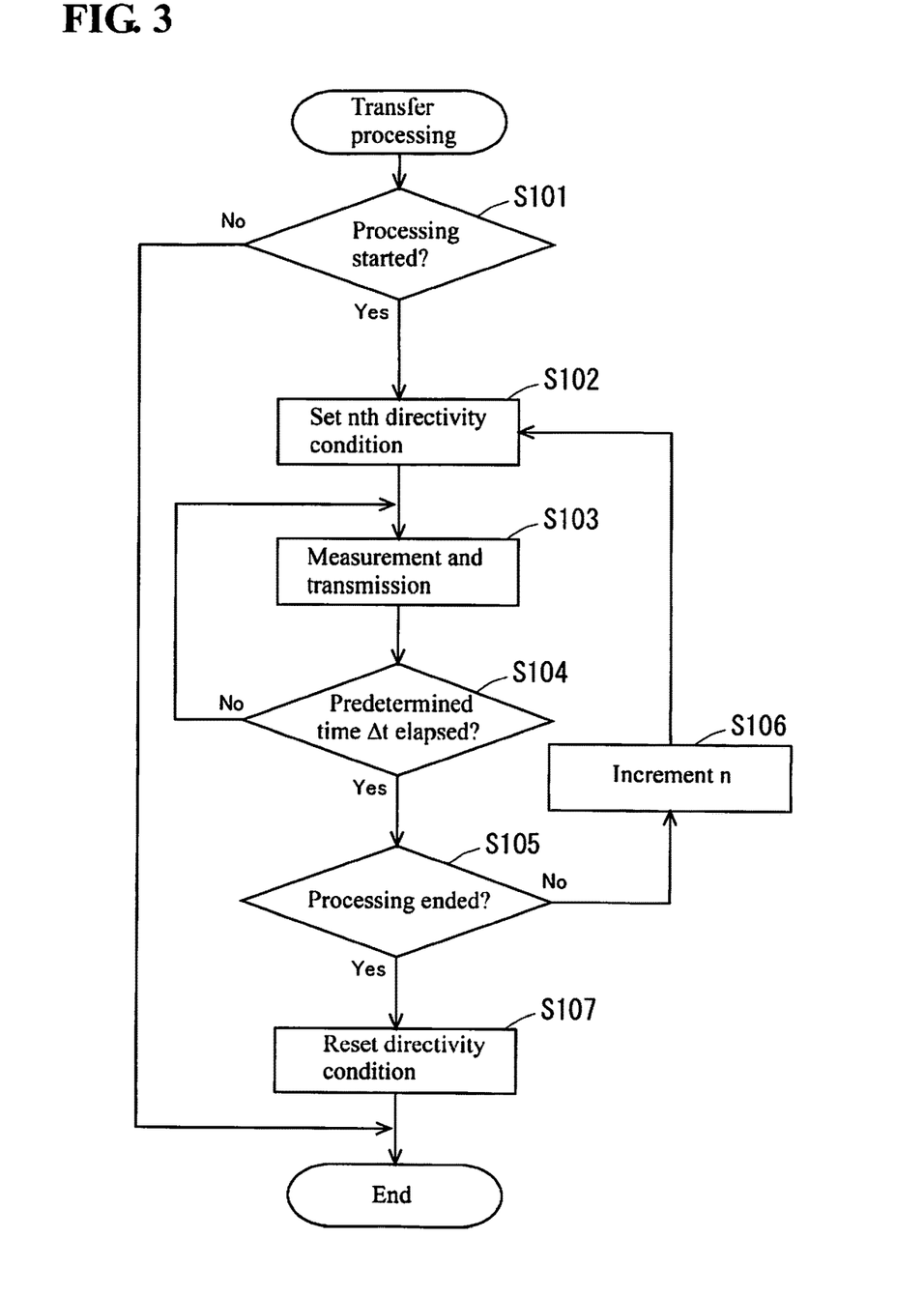
FIG. 3 is a flowchart of transfer processing executed in a radio of a machine tool, such as in FIG. 1.

In this manner, in the machine tool 10, if information on the temperature measured by the sensor 2 is transferred to the radio 1, it is preferable to perform wireless transfer between the radio 1 and the sensor 2, with consideration for generation of standing waves of wireless radio waves in the closed space in which the radio 1, the sensor 2, and the like are disposed. In view of this, the flow of processing for wirelessly transferring information on the temperature measured by the sensor 2 to the radio 1 is shown in the flowchart of FIG. 3. This transfer processing is performed mainly by executing a predetermined control program in a control unit provided in the radio 1. This control unit of the radio 1 has an arithmetic unit, a memory for storing a predetermined control program, and the like.

First, in step S101, it is determined whether or not cutting processing has been started in the machine tool 10. Specifically, as shown in FIG. 1 and the like, the radio 1 is electrically connected to the control apparatus 3, and thus is configured to be capable of grasping the situation of the control apparatus 3 controlling the motor 4 and the like. In view of this, it is possible to determine whether or not the cutting processing has been started, based on the information transmitted from the control apparatus 3. If an affirmative determination is made in step S101, the processing advances to step S102, whereas if a negative determination is made, this transfer processing is ended because it is not necessary for the sensor 2 to measure temperature information.

Next, in step S102, for wireless communication between the radio 1 and the sensor 2, a nth directivity condition from the start of this transfer processing is set in the phased-array antenna 1a. Here, a plurality of the directivity conditions set in the phased-array antenna 1a are stored in a memory provided in the control unit of the radio 1. Moreover, each of the plurality of directivity conditions is a condition with respect to which it is known that wireless communication that is efficient to some extent can be performed by being applied to the phased-array antenna 1a through a pre-experiment or the like, but has a possibility that the efficient wireless communication will be inhibited depending on the situation of standing waves generated in the closed space. Note that if this transfer processing is executed for the first time, n=1 is true, and accordingly, in step S102, the first directivity condition is set in the phased-array antenna 1a. When the processing of step S102 ends, the processing advances to step S103.

In step S103, a control signal for temperature measurement and transmitting the measured temperature information to the radio 1 is transmitted from the radio 1 to the sensor 2. The sensor 2 that received this control signal grasps the temperature information for grasping the state of the cutting tool 5, and transmits the temperature information to the radio 1. When the processing of step S103 ends, the processing advances to step S104. In step S104, it is determined whether or not a predetermined time $\Delta t$ has elapsed from when the nth directivity condition was set in step S102. This predetermined time $\Delta t$ is a time interval for switching the directivity condition as described later, and needs only be set as appropriate with consideration for influence of standing waves formed in the closed space on wireless communication between the radio 1 and the sensor 2. If an affirmative determination is made in step S104, the processing advances to step S105, whereas if a negative determination is made, the processing of step S103 onward is repeated.

In step S105, based on the information transmitted from the control apparatus 3, it is determined whether or not cutting processing has ended in the machine tool 10. If an affirmative determination is made in step S105, the processing advances to step S107, whereas if a negative determination is made, the processing advances to step S106. In step S106, the above-described n (that is, "n" for distinguishing the directivity conditions set in the phased-array antenna) is incremented. As a result, the processing of step S106 ends, and when the processing returns to step S102 again, the directivity condition set in the phased-array antenna 1a is switched to a condition that is different from the previous condition. As a result, the situation of standing waves in the closed space of the machine tool 10 is forcibly switched from the situation shown in FIG. 2A to the situation shown in FIG. 2B.

When an affirmative determination is made in step S105, the cutting processing ends in the machine tool 10, and thus the directivity condition set in the phased-array antenna 1a is reset, and when this transfer processing is started next time, preparation for setting the first directivity condition again is performed.

When such transfer processing is performed in the radio 1, measurement of the temperature information by the sensor 2 and transmission of the information to the radio 1 are repeated in a period during which cutting processing is performed in the machine tool 10, and the directivity condition set in the phased-array antenna 1a is switched every predetermined time $\Delta t$ in this wireless transmission. In the closed space of the machine tool 10, the work piece is positioned in various ways, or necessary cutting processing is performed, and thus the situation of standing waves of wireless radio waves generated therein may irregularly change. On the other hand, in general, it is difficult to accurately detect and grasp the situation of these standing waves, that is, where nodes of standing waves are formed in the closed space. Considering such circumstances, by switching the directivity condition set in the phased-array antenna 1a every predetermined time $\Delta t$, the above-described transfer processing makes it possible to avoid difficulty in transmission and reception of wireless radio waves via the phased-array antenna 1a due to nodes of standing waves that are envisaged to be generated, and accordingly, to suitably collect information on the temperature measured by the sensor 2 in the closed space via wireless communication. Also, in order to efficiently avoid the influence caused by nodes of these envisaged standing waves, for example, it is preferable to set the predetermined time $\Delta t$ to be relatively short, but if the directivity condition is switched at a relatively high frequency, the directivity of the phased-array antenna 1a changes even in a situation in which switching is not required, and thus note that switching does not always facilitate efficient wireless transfer.

Modification 1

Although the directivity condition set in the phased-array antenna 1a is switched every predetermined time $\Delta t$ in the above-described embodiments, instead of this mode, in a case where the received signal intensity of wireless radio waves received by the phased-array antenna 1a becomes lower than a predetermined threshold value, this decrease in the signal intensity is thought to be caused by nodes of standing waves in the closed space as described above, and the directivity condition set in the phased-array antenna 1a may be switched. Note that with regard to the directivity condition after switching, as in the transfer processing shown in FIG. 3, the directivity conditions stored in the control unit of the radio 1 may be switched successively.

Modification 2

Also, although standing waves generated in the closed space of the machine tool 10 are irregular as described above, for example, in a case where cutting processing with the same content is continuously performed on a plurality of work pieces in the machine tool 10, standing waves generated in the closed space are also generally generated repeatedly, and the influence caused by nodes of standing waves is also cyclic to some extent. In view of this, as described above, by associating time transition of the received signal intensity of wireless radio waves with the control content (the situation of driving of motors, the position of the table 8, and the like) for cutting processing obtained from the control apparatus 3, part of the control content of the cutting processing with which the received signal intensity becomes lower than a predetermined threshold value, that is, the control content with which influence of standing waves tends to arise may be learned. Then, when cutting processing is actually performed in the machine tool 10 with this control content, the directivity condition set in the phased-array antenna 1a may be switched. By doing so makes it possible to more quickly avoid the influence caused by nodes of standing waves and to suitably collect information on the temperature measured by the sensor 2 in the closed space via wireless communication.

Note that with regard to the directivity condition after switching as well, a directivity condition under which the influence of standing waves does not easily arise is obtained by learning, and thereby it is possible to continue stable collection of temperature information even after the directivity condition is switched.

Modification 3

Standing waves that influence wireless communication between the radio 1 and the sensor 2 are generated due to wireless radio waves being reflected by the inner wall surface of the body 11 of the machine tool 10 and overlapping with other radio waves. In view of this, in order to reduce the influence caused by nodes of standing waves, a radio wave absorbing member that absorbs radio waves is preferably disposed on the inner wall surface of the body 11. A member exhibiting a radio wave absorbing property corresponding to frequencies of wireless radio waves used in wireless communication between the radio 1 and the sensor 2 need only be selected as the radio wave absorbing member as appropriate. A composite ferrite radio wave absorbing member formed by mixing ferrite powder to synthetic rubber or a composite magnetic radio wave absorbing member formed by mixing carbonyl iron powder to synthetic rubber can be utilized as one example. These radio wave absorbing members can adjust the frequencies of radio waves exhibiting suitable absorptivity by adjusting the addition amount of ferrite powder or carbonyl iron powder that is to be mixed. In addition, a composite ferrite radio wave absorbing member formed by mixing hexagonal ferrite powder to synthetic rubber, a planer radio wave absorbing material formed by utilizing ohmic loss of carbon with use of polyethylene foam as the base material, or the like can also be adopted.

Embodiment 2

Figure 4A:
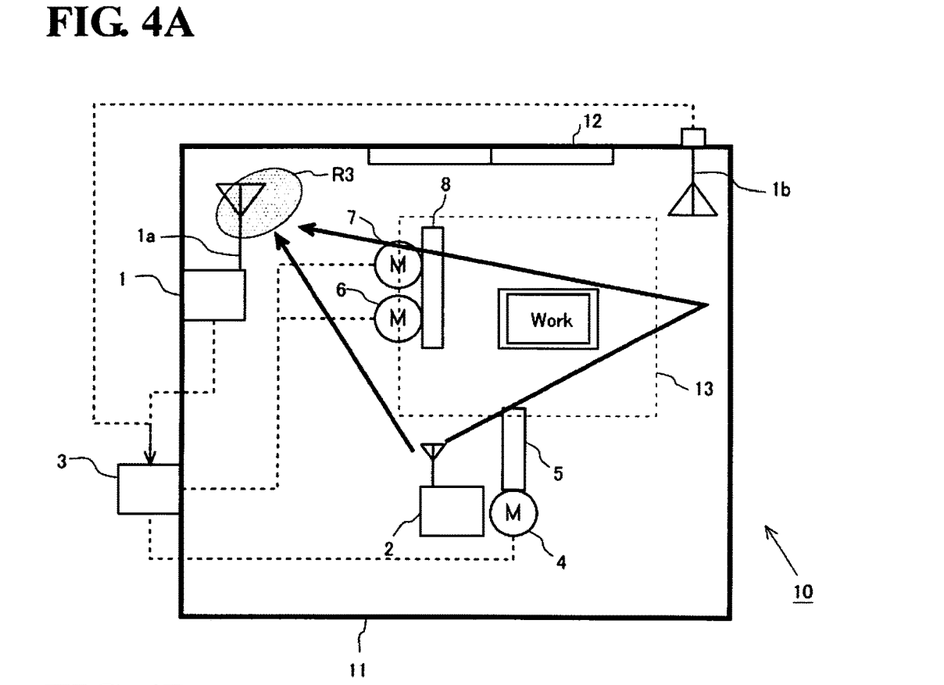
FIGS. 4A and 4B are diagrams illustrating positions of nodes of standing waves caused by wireless radio waves in a machine tool, such as in FIG. 1.
Figure 4B:
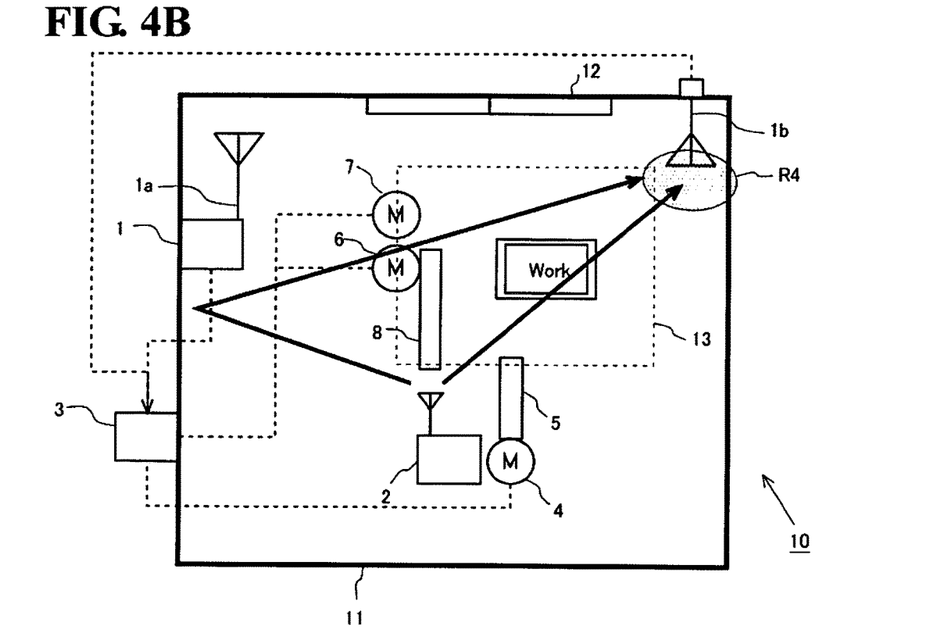

In one or more embodiments, the radio 1 is configured to have two antennas that support diversity communication. Specifically, as shown in FIGS. 4A and 4B, the radio 1 has a first antenna 1a and a second antenna 1b. The first antenna 1a and the second antenna 1b in one or more embodiments are not directional antennas but omnidirectional antennas. Note that, in one or more embodiments, FIGS. 4A and 4B show two different situations with regard to formation of nodes of standing waves in the closed space in a case where wireless communication is performed between the radio 1 and the sensor 2 in the closed space in the machine tool 10. In the situation shown in FIG. 4A, nodes of standing waves are formed in a region R3 located in the vicinity of the first antenna 1a depending on the situation of driving of motors, the position of the table 8, and the like. Also, in the situation shown in FIG. 4B, nodes of standing waves are formed in a region RA located in the vicinity of the second antenna 1b depending on the situation of driving of motors, the position of the table 8, and the like.

In view of this, in the case shown in FIG. 4A, it is preferable to perform wireless communication between the radio 1 and the sensor 2 using the second antenna 1b out of the two antennas. Also, in the case shown in FIG. 4B, it is preferable to perform wireless communication between the radio 1 and the sensor 2 using the first antenna 1a out of the two antennas. Note that the situation of standing waves shown in FIGS. 4A and 4B is merely an example, and standing waves other than in these situations naturally exist. The situation of standing waves formed in the closed space may regularly or irregularly change in accordance with movement of the table 8 or the work piece in the closed space of the machine tool 10.

In view of this, in one or more embodiments, in the transfer processing shown in FIG. 3, the first antenna 1a and the second antenna 1b may be alternately switched every predetermined time Δt as the antenna used for wireless communication between the radio 1 and the sensor 2. Alternatively, as another method, when the received signal intensity is lower than a predetermined threshold value while wireless communication is performed utilizing one of the antennas, the antenna in use may be switched so as to perform wireless communication utilizing the other antenna. By performing control of switching the antenna in use in this manner, it is possible to reduce the influence caused by nodes of standing waves that are envisaged to be generated, and accordingly, to suitably collect information on the temperature measured by the sensor 2 in the closed space via wireless communication.

INDEX TO THE REFERENCE NUMERALS

1 Radio
1a Phased-array antenna, first antenna
1b Second antenna
2 Sensor
3 Control apparatus
4, 6, 7 Motor
5 Cutting tool
8 Table
10 Machine tool
11 Body
12 Door portion

The invention claimed is:

1. A radio capable of performing wireless communication with a sensor that measures a predetermined environmental parameter in a predetermined closed space, the radio comprising:
   an antenna portion disposed in the predetermined closed space, the antenna portion being capable of transmitting radio waves to the sensor and receiving radio waves from the sensor; and
   a control unit executing a program to control a direction in which the antenna portion transmits the radio waves to the sensor and receives the radio waves from the sensor such that the radio waves transmitted to the sensor or radio waves received from the sensor cause a standing wave to be formed in the predetermined closed space, the control of the direction causing the standing wave to change over time during the wireless communication, the change in the standing wave over time comprises a change in a position of a node of the standing wave from a first position associated with a first directivity condition applied to the antenna portion to a second position different from the first position associated a second directivity condition applied to the antenna portion, over time in the predetermined closed space.

2. The radio according to claim 1,
wherein the antenna portion comprises a plurality of antennas that support diversity communication, and
the control unit switches an antenna from among the plurality of antennas that transmits radio waves to the sensor and an antenna from among the plurality of antennas that receives radio waves from the sensor such that the standing wave changes over time during the wireless communication.

3. The radio according to claim 1,
wherein the antenna portion comprises a directional antenna, and
the control unit changes from the first directivity condition that is applied to the directional antenna to the second directivity condition such that the standing wave changes over time during the wireless communication.

4. The radio according to claim 3,
wherein the control unit controls which of the first directivity condition or the second directivity condition is applied to the directional antenna based on a received signal intensity of the radio waves received by the antenna portion.

5. The radio according to claim 1,
wherein the predetermined closed space is provided with a transparent window such that inside of the predetermined closed space is visible from outside of the predetermined closed space, and
the window is covered with a transparent metal film.

6. The radio according to claim 1,
wherein a radio wave absorbing member that absorbs radio waves having a predetermined frequency that is used in the wireless communication with the sensor is disposed on an inner wall surface of the predetermined closed space.

7. The radio according to claim 1,
wherein a processing apparatus for machining an object to be processed is disposed in the predetermined closed space, and a lubricant for machining is used during the machining of the object by the processing apparatus.

* * * * *